United States Patent [19]

Kruder

[11] 4,363,768

[45] * Dec. 14, 1982

[54] METHOD OF INJECTION MOLDING EMPLOYING MULTICHANNEL WAVE SCREW

[75] Inventor: George A. Kruder, Marion, Ohio

[73] Assignee: HPM Corporation, Mount Gilead, Ohio

[*] Notice: The portion of the term of this patent subsequent to Nov. 6, 1996, has been disclaimed.

[21] Appl. No.: 234,397

[22] Filed: Feb. 13, 1981

Related U.S. Application Data

[60] Division of Ser. No. 25,884, Apr. 2, 1979, Pat. No. 4,285,600, which is a continuation-in-part of Ser. No. 917,204, Jun. 20, 1978, Pat. No. 4,173,417, which is a continuation-in-part of Ser. No. 788,028, Apr. 15, 1977, abandoned.

[51] Int. Cl.³ .............................................. B29F 1/02
[52] U.S. Cl. .............................. 264/68; 264/328.14; 264/328.17; 264/349
[58] Field of Search ................... 425/208; 366/88, 89; 264/328.14, 68, 328.17, 349

[56] References Cited

U.S. PATENT DOCUMENTS

| | | | |
|---|---|---|---|
| Re. 28,901 | 7/1976 | Kim | 425/208 |
| 3,593,843 | 7/1971 | Hill | 198/213 |
| 3,687,423 | 8/1972 | Koch . | |
| 3,701,512 | 10/1972 | Schippers | 366/89 X |
| 3,737,151 | 6/1973 | Schaeffer | 425/209 |
| 3,858,856 | 1/1975 | Hsu | 366/89 |
| 3,866,890 | 2/1975 | Tadmor | 425/208 X |
| 3,867,079 | 2/1975 | Kim | 425/208 |
| 3,870,284 | 3/1975 | Kruder . | |
| 3,881,708 | 5/1975 | Carle . | |
| 3,897,937 | 8/1975 | Limbach | 425/208 X |
| 4,015,832 | 4/1977 | Kruder | 425/208 X |
| 4,053,143 | 10/1977 | Hosokawa | 366/89 |
| 4,079,463 | 3/1978 | Miller | 366/89 |
| 4,128,341 | 12/1978 | Hsu | 366/89 |
| 4,173,417 | 11/1979 | Kruder | 366/89 |
| 4,184,772 | 1/1980 | Meyer | 366/89 X |

FOREIGN PATENT DOCUMENTS

1266136 3/1972 United Kingdom .
1266142 3/1972 United Kingdom .

Primary Examiner—Thomas P. Pavelko
Attorney, Agent, or Firm—Gust, Irish, Jeffers & Hoffman

[57] ABSTRACT

An injection molding apparatus is disclosed which includes a screw having a multichannel wave screw section. In the wave screw section, a helical passage defined by a radially extending helical screw flight is divided into a pair of flow channels by a radially extending helical barrier. The helical barrier is radially shorter than the helical conveying flight and the effective outer width thereof is axially narrower than the helical conveying flight. Each flow channel is provided with an undulating base surface that defines a plurality of wave cycles. The base surface varies in a radial direction between a valley portion and a crest portion for the wave cycle and a wave cycle is defined as extending between consecutive crest portions. The crest portions of one flow channel are helically displaced from the crest portions of the adjacent flow channel.

3 Claims, 9 Drawing Figures

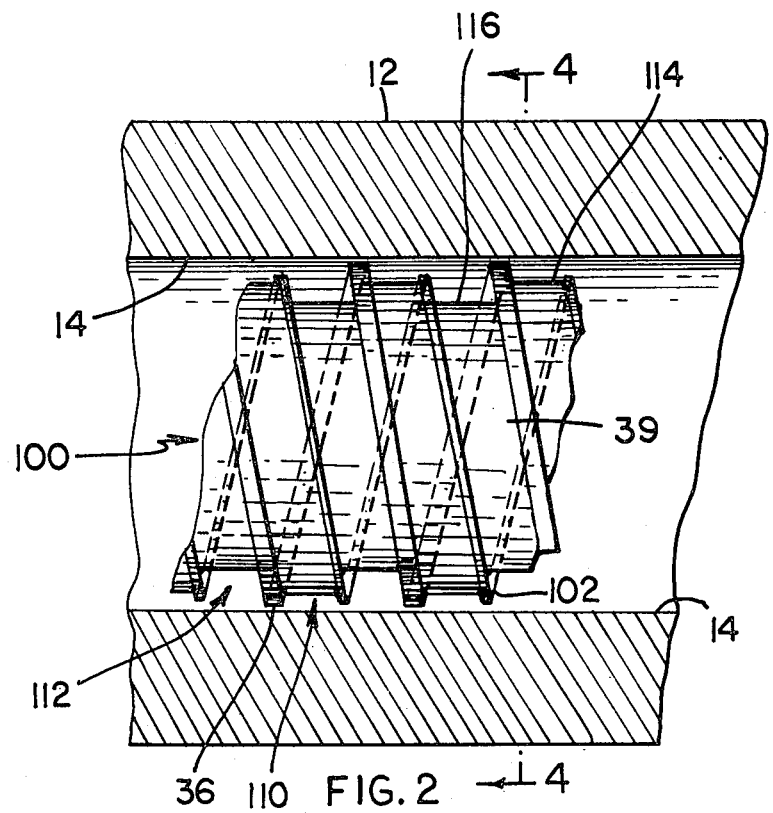
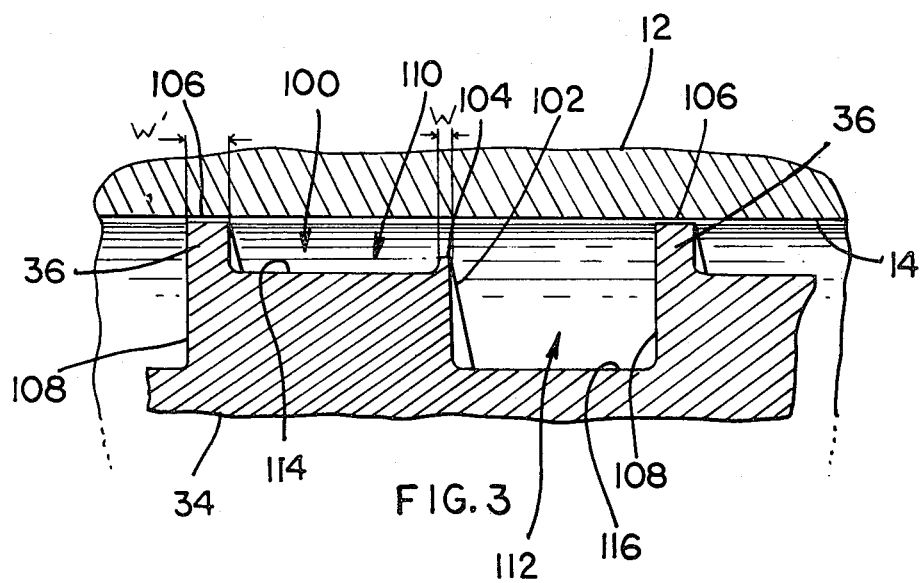

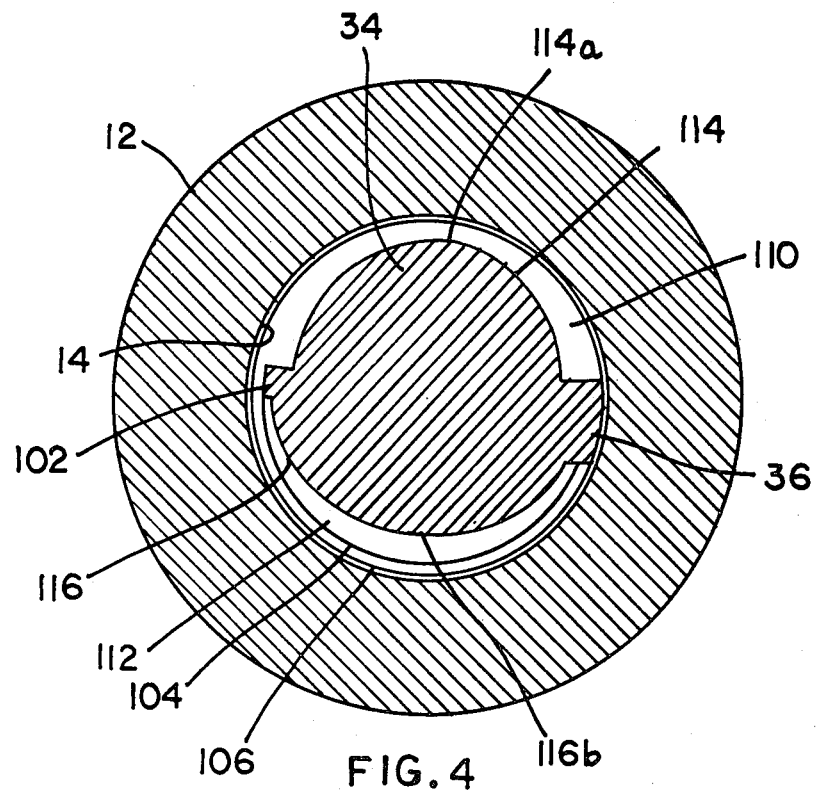
FIG. 4
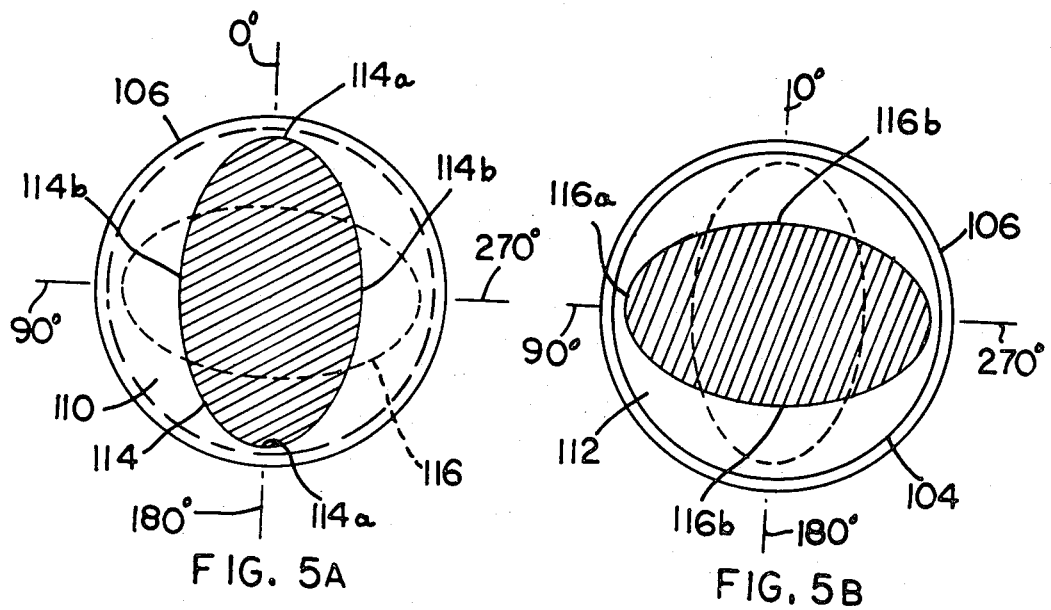
FIG. 5A
FIG. 5B

METHOD OF INJECTION MOLDING EMPLOYING MULTICHANNEL WAVE SCREW

CROSS REFERENCE TO RELATED APPLICATIONS

This is a division of application Ser. No. 025,884, filed Apr. 2, 1979, which is now U.S. Pat. No. 4,285,600, issued Aug. 25, 1981, which is a Continuation-in-part of application Ser. No. 917,204 filed June 20, 1978 now U.S. Pat. No. 4,173,417, which is a continuation-in-part of application Ser. No. 788,028 filed Apr. 15, 1977, now abandoned.

BACKGROUND OF THE INVENTION

This invention relates to an method for injection molding of synthetic resinous materials, and more particularly to an improved injection molding screw.

The injection molding of synthetic resinous materials has long been known and a wide variety of devices have been used for plasticating material prior to its injection into a mold. Screws are particularly well suited for this purpose.

In order to obtain acceptable injection molded products, the plasticated synthetic material must have homogeneous properties. More particularly, the temperature distribution throughout the material must be highly uniform in order to avoid generating internal stresses in the molded product. In addition, the plasticated material must be well mixed in those instances where additives such as colorants or reinforcing materials are mixed with the plasticated material prior to injection. Lack of adequate mixing where additives are used can affect not only the surface appearance of a molded article but also the structural integrity of the product.

Another difficulty to be avoided is the presence of incompletely plasticated particles of the particulate feed material in the accumulating reservoir of plasticated material in the machine. Such particles are detrimental and can obstruct the internal passages of a mold causing unacceptable products to be molded.

Another complicating factor in the design of injection molding machines is the fact that the barrel and the rotatable reciprocable screw are cantilever-mounted. Accordingly, the processing portions of the screw cannot be increased in length to improve mixing and temperature distribution without regard to the effect that such a length increase would have on the overall design of the machine. Moreover, since the screw ordinarily reciprocates through a distance of approximately four times the screw diameter, a comparatively long length is required for the feed section of the screw in which the particulate material is initially received and compacted. The length of the feed section thus imposes a demand for high efficiency in downstream processing sections.

To improve plasticated material uniformity some injection molding machine includes a screw provided with a mixing section in which the plasticated material is forced to mix with itself. The addition of a mixing section to an injection molding machine screw necessarily increases the length of that screw, the length of the surrounding barrel, the cost of the machine, and requires adjustment of the length and position of other processing section of the machine screw. Also, if the mixing section design includes close-clearance barriers in primary flow channels, this can easily trap tramp metal, causing rapid wear.

Accordingly, it will be seen that the need continues to exist for an injection molding machine have more efficient processing sections to produce a homogeneous reservoir of plasticated synthetic resinous material for injection molding purposes. The present invention enables improved melting capacity for the screw in a relatively short length barrel, which is very desirable in injection molding machines.

SUMMARY OF THE INVENTION

In accordance with the present invention, an injection molding machine is provided with a screw having a multichannel wave screw section. In a conventional molding machine screw, a radially extending helical conveying flight defines a helical passage. In a multichannel wave screw, this helical passage is divided by a radially extending undercut helical barrier into flow channels. Each flow channel includes a base surface which undulates radially through a plurality of wave cycles along the length of the flow channel. The undercut barrier flight filters across a melt-rich fraction leaving behind to approach the wave crests a solids enriched fraction.

In this connection, the undulations of the base surface, i.e., the wave cycles, may occur with the crest-to-crest wave length being uniform although uniformity is not critical. To enhance the mixing of plasticated material with itself, crests of the wave cycles in one flow channel are displaced relative to the crests of wave cycles in the adjacent flow channel. In this fashion, plasticated material may pass over the helical barrier from one flow channel to the adjacent flow channel. By selecting the clearance between the barrel and the edge surface of the barrier so that most unplasticated particles will continue to move along the flow channel into a wave crest area, unplasticated particles of material will be subjected to intensive shearing forces while passing over each crest in each flow channel. Accordingly, these unplasticated particles will be preferentially melted and plasticated.

So that the already plasticated material is not excessively heated as it passes through the clearance between the helical barrier and the surrounding barrel, the effective outer axial width of the helical barrier is selected to be less than the effective outer axial width of the helical conveying flight.

By providing the undulations in the flow channels with a wave length which is equal to or less than the helical pitch length of the flow channel (i.e., the distance extending helically along the screw for one 360° revolution around the screw axis), the plasticated synthetic resinous material will be subject to intensive shearing at the wave crests frequently during screw rotation. In this fashion, the axial length of the screw section may be minimized so as to effect an overall reduction in screw length without sacrificing homogeneity of the plasticated product.

To further intensify the degree of mixing effected by the undulating flow channels, the total flow area of two adjacent flow channels may vary cyclically along the helical passage. This variation makes the flow patterns even more complex and, may improve the homogeneity of the plasticated material.

Another variation which may be incorporated in the screw section is to provide the wave crests with increasing radial height in a downstream direction along each flow channel of the screw section. In this manner, the flow channels accommodate a higher proportion of unplasticated particles at the upstream end of the channel, and any pressure pulses associated therewith are relieved by the barrier land clearance. Moreover, the unplasticated particles tend to decrease in size as they move downstream through the flow channel and the more severe shearing action exerted by the successive wave crests causes more rapid plastication of the material.

BRIEF DESCRIPTION OF THE DRAWINGS

Many objects of the present invention will be apparent to those skilled in the art when this specification is read in conjunction with the accompanying drawings wherein like reference numerals have been applied to like elements and wherein:

FIG. 2 is an enlarged partial cross-sectional view of a section of the molding machine screw;

FIG. 3 is a detailed view in cross-section showing characteristics of the flow channels;

FIG. 4 is a cross-sectional view taken along the line 4—4 of FIG. 2;

FIGS. 5a and 5b are schematic illustrations of two different flow channels with radial variations exaggerated.

DETAILED DESCRIPTION

Before considering in detail the characteristics of the improved injection molding screw, it will be helpful to consider the features of a typical injection molding machine.

Figure 1:
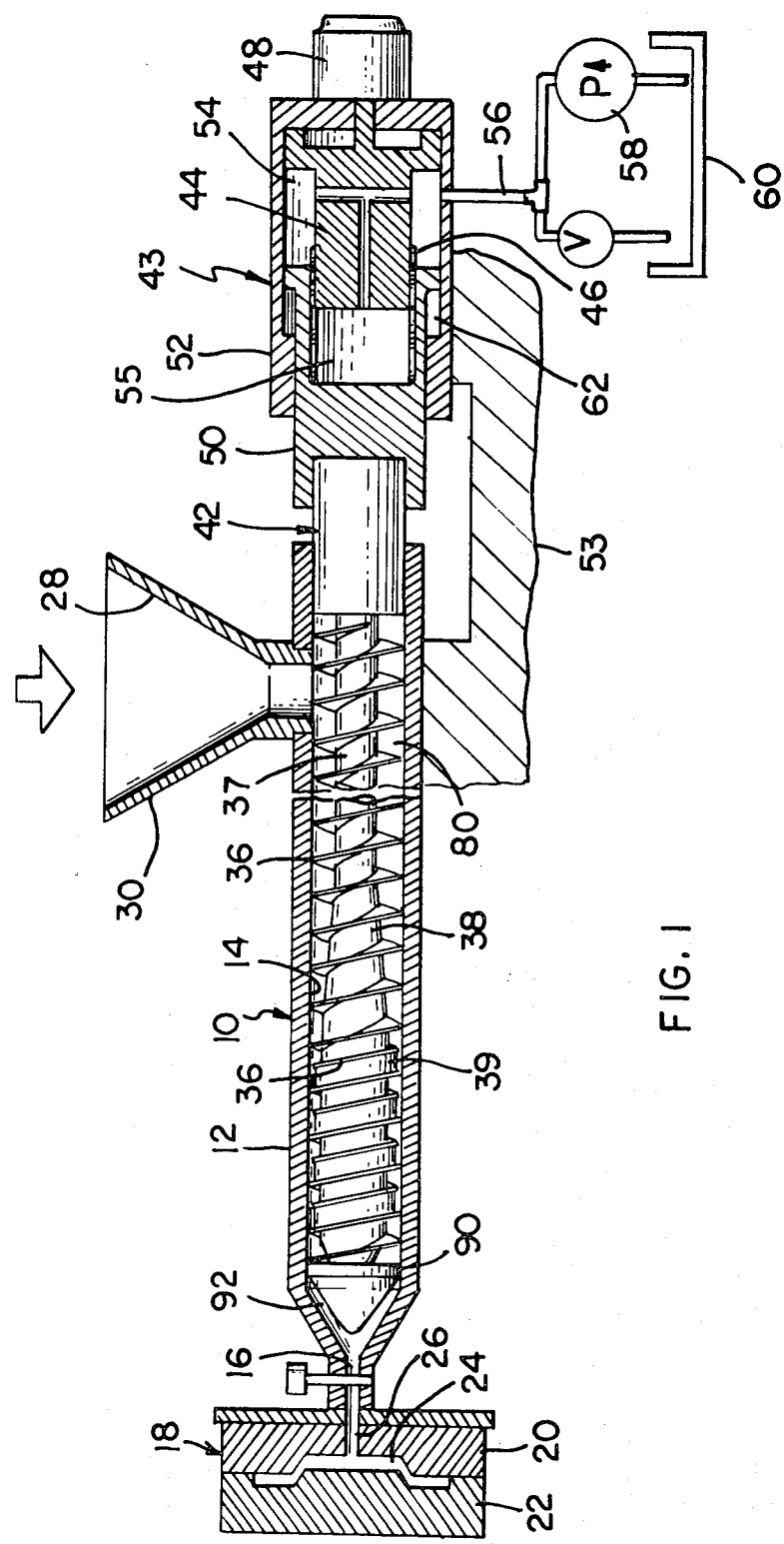
FIG. 1 is a view in partial cross section of an injection molding machine.

Turning now to FIG. 1, an injection molding machine 10 is depicted which includes a barrel 12 having a longitudinal extending screw receiving bore 14. At one end of the barrel 12 is a discharge opening 16 which communicates with the bore 14 and with a mold 18. The mold 18 includes a first mold portion 20 and a second mold portion 22 which are relatively movable and which cooperate to define a mold cavity 24. The mold cavity 24 communicates with the discharge opening 16 through a sprue 26.

At the other end of the barrel 12, remote from the discharge opening 16, is a feed opening 28. The feed opening 28 communicates with the screw receiving bore 14 and may be disposed in a generally vertical posture, as illustrated. Positioned externally of the bore 28 and mounted on the barrel 12 is a suitable hopper 30 through which particulate feed material is supplied to the screw receiving bore 14 for plasticization. Screw 34 has a helical screw flight 36 extending along the length thereof which cooperates with the bore 14 to define a helical passage having a depth determined by the difference between the bore diameter and the corresponding screw root diameter. In registry with the feed opening 28, screw 34 has a feed section 37 that is operable to receive particulate feed material.

Downstream of the feed section 37 is a transition section 38 in which the depth of the helical passage decreases from a relatively large value in the feed section 37 to a relatively small value in the pumping section 39. Pumping section 39 has a drag flow capacity approximately defined by well known parameters (see, for example, Bernhardt, *Processing of Thermoplastic Materials* Van Nostrand Reinhold Co. 1959). By way of example, feed section 37, transition section 38 and pumping section 39 may comprise 45%, 25% and 30%, respectively, of screw 34.

The screw 34 includes a portion 42 which protrudes from the barrel 12 at the end remote from the mold 18. The protruding screw portion 42 cooperates with apparatus 43 for rotating and reciprocating the screw within the screw receiving bore 14.

As part of the reciprocation apparatus, the screw 34 includes a piston end portion 50 which is reciprocably mounted within a suitable cylinder 52 that may be attached to the machine base 53. The cylinder 52 is divided into a first working chamber 54 and a second chamber 62 by the piston end portion 50. The first working chamber 54 receives pressurized hydraulic fluid through a conduit 56 from a pump 58 and a reservoir 60.

The screw rotating apparatus may comprise, for example, a driven shaft 44 having longitudinally extending teeth 46. The shaft 44 may be driven by a suitable conventional motor 48 mounted at the distal end of the cylinder 52. The teeth 46 are received in a conformingly shaped recess 55 in the piston 50 such that rotation of the shaft 44 is imparted to the piston 50 and the screw 34.

There is a condition on the location of the wave section 39: the material must already be sufficiently plasticated to have a melted phase and an unmelted phase. Preferably, melting is about forty percent or more complete at the start of wave section 39 so as to avoid erratic blockage in the screw channels.

A typical multichannel wave screw section will now be described for use as the pumping section 39.

Turning to FIG. 2, the helical screw flight 36, which defines a material conveying flight, also defines a helical passage 100. This helical passage is defined by radially extending surfaces of the helical conveying flight 36, by the root surface of the screw extending between the radially extending surfaces of the conveying flight 36, and by the screw receiving bore 14 of the barrel 12.

Positioned centrally in the helical passage 100 is a radially extending undercut helical barrier 102. This helical barrier has a peripheral surface 104 (see FIG. 3) that has an effective outer axial width W which is substantially less than the effective outer axial width W' of the peripheral surface 106 of the conveying flight 36 (in the example shown). In particular, the width W of the surface 104 may for example be less than eight percent of the screw pitch, defined as the axial distance which the radial surface 108 advances during one 360° revolution about the axis of the screw 34. In some applications, the width W of the helical barrier will lie in the range of one to four percent of the screw diameter. The axial width of the helical barrier surface 104 is selected such that it does not impart substantial shearing to plasticated material passing thereover, which generates heat and thus elevates the material temperature. The undercut barrier is dimensioned such that the melt-rich fraction can move easily over it, yet the solids will be impeded from crossing.

The helical barrier 104 divides the helical passage 100 into two parallel helically extending flow channels 110, 112. Each flow passage 110, 112 has a corresponding base surface 114, 116 which undulates in a radial direction as it progresses helically along the screw 34. Undulations of the base surfaces 114, 116 may be uniform, and define wave cycles having crests and valleys. The helical distance between crests of a flow channel may be called a wave cycle or wave length. In addition, the number of wave cycles in flow channel 110 is preferably equal to the number of wave cycles in flow channel 112 so that each channel provides the same apparent flow restriction.

Turning now to FIG. 4, a cross section through the screw 34 shows a preferred embodiment for the undulating flow channels. In flow channel 110, the bottom surface 114 has a wave crest 114a on the top of FIG. 4. Similarly, the base surface 116 of flow channel 112 has a valley portion 116b at the bottom of FIG. 4.

While a cross-section through the helical screw primarily illustrates the two flow channels, FIGS. 5a and 5b schematically illustrates exaggerated radial variations of the base surface in each flow channel 110, 114, respectively, as the flow channel winds around the screw axis, in an example of short-cycle waves, wherein each wave cycle is 180°.

In this connection, FIG. 5a may be considered to be an illustration of the radial variation of the base surface 114 between maximum radius portions, or wave crests at 114a and minimum radius portions, or valleys, 114b. It will be seen from FIG. 5a that the helical length of one crest to crest wave cycle in the flow channel 110 corresponds to an angle of 180° about the axis of the screw. Moreover, it will be seen from FIG. 5b that the helical length of one crest-to-crest wave cycle in flow channel 112 is also 180°. FIG. 5a also show the relative orientation of the base surface portions 114, 116 at corresponding angular positions about the axis of the screw. Thus, the base surface 114 has a relative maximum 114a at the zero degree location whereas the base surface 116 has a relative minimum 116b at the zero degree location. The wave crests in the two flow channels are thus out of phase with one another.

With the wave crests 114a, 116a being angularly displaced from one another about the screw axis, the base surface 114 (see FIG. 3) will be increasing in radius while the base surface 116 is decreasing in radius. Thus, as unplasticated particles moving through flow channel 110 approach a wave crest, the plasticated material will tend to flow over the barrier 102 into the adjacent flow channel 112. As a result, the intensive shear forces applied at the wave crest heat and plasticate the particles in flow channel 110 after solids enrichment but do not operate on a substantial portion of the already plasticated material to correspondingly increase its temperature.

The radial clearance between each wave crest 114a, 116a and the barrel may be selected to lie in the range of 0.03 to 0.15 times the square root of the diameter of the screw receiving bore 14. Moreover, the maximum depth of the flow channels 110, 114, which occurs at the valley 114b, 116b, may be selected to lie in the range of 2 to about 6 times the radial clearance which occus at the wave crests.

Figure 6:
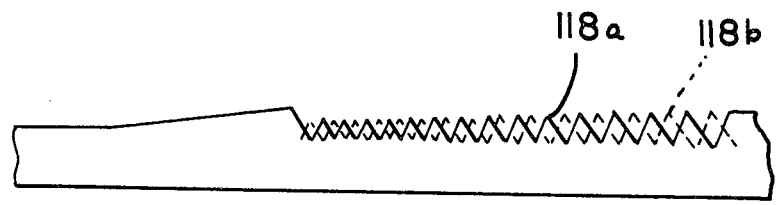
FIGS. 6, 7 and 8 are diagrammatic views of three alternative channel wave patterns.
Figure 7:
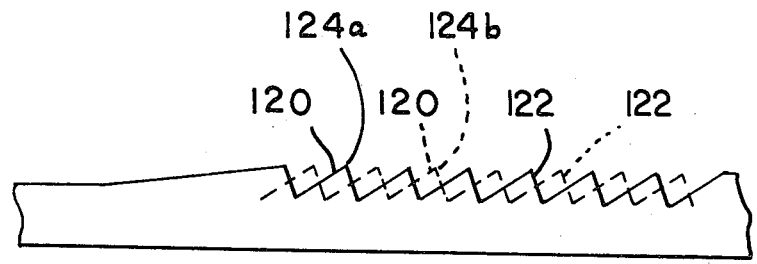

Other modifications of the undulating screw surface may also be incorporated in the multichannel wave screw. For example, as illustrated in FIG. 6, the downstream wave crests of each flow channel 118a and 118b may provide successively smaller radial clearances so that upstream wave crests may accommodate larger concentrations of unplasticated particles. In addition, the helical length of the increasing radius part 120 of the flow channel base surface may be greater than the helical length of the decreasing radius part 122 of the flow channel base surface, as shown in FIG. 7, for the respective channels 124a and 124b.

Figure 8:
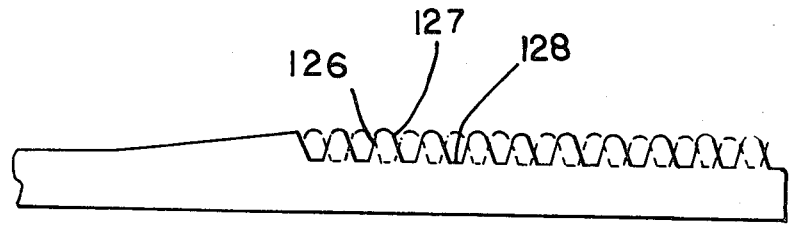

Alternatively, the wave crests may rise from a flat base surface portion which has a substantial helical length. More particularly, as illustrated in FIG. 8. each wave cycle may include a helical length of increasing base surface radius 126, a helical length of decreasing base surface 127 and a helical length of constant base surface radius 128. Preferably, the maximum base surface radius portion of one channel would be disposed adjacent to a constant base surface radius of the adjacent flow channel.

Although the screw illustrated and described above has a wave cycle of 180°, a screw having a wave cycle of 360° or some other suitable balanced desesign may be preferred in some cases. In general, it is desirable to distribute the wave crests in such manner as to minimize side thrust of the screw during rotation. For injection molding it is usually not necessary for the meter section to develop high back pressure during screw rotation; so selection of the wave cycle is not highly dependent on pumping characteristics of the wave design.

For convenience in describing the operation of the injection molding machine, (FIG. 1) the injection molding machine cycle is described in terms of a plasticating portion in which the screw 34 is rotating and an injection portion in which the screw 34 is not rotating. Thus, injection portion, as used herein would encompass the injection stroke and the holding portion of many typical molding machine cycles.

In operation, particulate feed material of a synthetic resinous material is positioned in the hopper 30 (FIG. 1) for processing and molding into an article whose configuration is defined by the cavity 24 in the mold 18. During steady flow operation in the plasticating portion, the particulate material drops into the helical passage 80 of the feed section 37 defined by the bore 14 and the relatively deep screw flights 36 of the screw 34.

The material is accepted by the feed section 37 and, while the screw 34 is rotated by the rotary drive apparatus 44, 46, 48, the material is conveyed forwardly (to the left in FIG. 1) and into the transition section 38.

The flow of synthetic resinous material from the transition section 38, which is preferably at least forty percent melted, is divided between the flow channels 110, 112 (see FIG. 2) as it enters the multichannel wave screw section 39. The plasticated material as well as the solid material in one of the flow channels 110, 112 eventually approaches the first wave crest.

Without a undercut barrier flight 102, all of the plasticated material and the solid unplasticated material would pass through the restriction at each wave crest. Consequently, at the first few wave crests the particles squeezing through the restriction tend to exhibit rapidly varying partial blockage of the liquid path. Since there would be no way for the liquid plastic or plasticated material to communicate with an alternate flow path, small and rapid hydraulic pressure pulses would likely occur in the first few waves in situations where melting is fairly incomplete.

By contrast, in the multichannel wave screw section having an undercut barrier flight, the plasticated material approaching a wave crest in one flow channel is in communication with an adjacent deeper channel across the undercut, narrow barrier 102. Since significant amounts of the plasticated material can thus transfer to the deeper channel region, the formation of pressure pulses is minimized. Moreover, by removing some plasticated material from the first flow channel, the unplasticated particles are able to wedge up into each wave crest restriction more easily. This assures more rapid plastication of the particles jammed into the wave crests.

Positioned at the distal end of the screw 34 may be a suitable conventional nonreturn valve 90 which allows the plasticated material to enter a cavity 92 defined by the bore 14, the discharge opening 16 and the distal end of the screw 34. The nonreturn valve 90 permits the material to enter the cavity 92 but prevents the material in the cavity 92 from moving upstream into the helical channels 110 and 112 of pumping section 39.

As the screw 34 rotates, material is continuously conveyed forwardly through pumping section 39 and into the cavity 92. Simultaneously, the screw 34 translates rearwardly, to the right in FIG. 1, enlarging the volume of the cavity 92 to accommodate additional plasticized material. This enlargement of the cavity 92 occurs during the plastication portion of the injection molding machine cycle. When a sufficient volume of material has been accumulated in the cavity 92 to fill the mold cavity 24, the plastication portion of the cycle ends and the rotary drive apparatus stops rotation of the screw 34.

The injection portion of the cycle then begins and the first chamber 54 of the cylinder 52 is then pressurized such that hydraulic pressure acting on the piston 50 causes the screw 34 to translate toward the left end of the screw receiving bore 14. As the screw 34 translates the volume of the cavity 92 decreases and the nonreturn valve 90 prevents material trapped in the cavity from flowing upstream into helical channels 110 and 112.

Pressure develops in the cavity 92 as a result of the screw movement and causes plasticized material to pass outwardly through the discharge opening 16 into the sprue 26 and the mold cavity 24. The hydraulic pressure in the first chamber 54 may be maintained at a lower level after the mold cavity 24 has been filled to ensure that sufficient material is injected and to maintain the requisite dimensional tolerances. After the injection cycle, the rotary drive apparatus begins to rotate the screw to accumulate a new charge of material. In addition, the article formed during the previous cycle is removed from the mold in a conventional manner.

In practice, the wave crests for the multichannel wave screw section having an undercut barrier can be made more restrictive than those of single channel wave screws. Results obtained during experimentation show that the twin channel, or multichannel, wave screw section can produce faster melting and greater flow stability than single channel wave screws. Furthermore, a single design can given outstanding performance with a wide range of polymers.

In accordance with the present invention the advantages are achieved without excessive heating of the plasticated material. The narrow configuration of the barrier flight imparts minimal energy input, and thus minimal heat, to the plasticated material. Therefore, plasticated material passes across the undercut barrier with minimal heat input and, in so doing avoids travel through a wave crest restriction and the heat input which would accompany such travel. The clearance between the barrier flight and the barrel promotes the transfer of plasticated material while resisting the transfer of unplasticated materials. Accordingly, the temperature, as well as temperature fluctuations, of the melt at the screw outlet are maintained within an acceptable range.

The wave crest restrictions are maintained sufficiently shallow to assure that intensive shearing and heating of solid particles occurs during each brief exposure period. By maintaining a non-uniform cross-sectional area in the helical passage throughout a substantial extent of each wave cycle, the mixing action may be further intensified. Intensive mixing also takes place as a result of asymmetrical arrangement wherein the wave portion of increasing radius is longer than the portion of decreasing radius.

Moreover, when using a wave length which is less than 360°, the intensity of the mixing and plastication is increased substantially. This increase in mixing and plastication permits the metering or pumping section to be shorter than heretofore possible while providing a more homogeneous and cooler material. In addition, the injection molding machine itself is shorter and less expensive.

Unbalanced side forces acting on the screw during plastication should be minimized by balancing the angular locations of the wave crests. For example, an integral number of wave cycles may be provided with wave crests equal in number and staggered 180° apart. In this manner, the pressure forces exerted on the screw by the synthetic resinous material during plastication are substantially balanced both circumferentially and axially along the screw.

The angular extent of the wave length of flow channel undulations has been found to be important. For example, when the wave length becomes less than 120°, the multi-channel wave screw performs primarily as a mixing section and does not generate significant amounts of hydraulic pressure in the plasticated material. On the other hand, with longer wave lengths significant pumping or pressurization of the plasticated materials can be produced in addition to the mixing function described above. For many injection molding applications the pressure development required from the wave metering section is minimal.

For injection molding machine purposes, a wave length less than 360°, i.e., a quick cycle of undulations, is preferred since it permits the length of the processing section to be reduced thereby reducing the cost and length of the injection molding machine itself.

Since advantages are also provided by the multichannel wave screw in which the wave length exceeds 360°, the invention, in its broader aspects, will be understood to include an injection molding machine provided with such a screw.

In summary, a screw section of an injection molding machine constructed in accordance with the teachings of this application provides a homogeneous well-mixed plasticated output with comparatively low temperature that is essentially free of unplasticated particulate matter.

It should now be apparent that there has been provided in accordance with the present invention novel injection molding apparatus which overcomes problems associated with prior art devices. Moreover, it will be apparent to those skilled in the art that numerous modifications, variations, substitutions and equivalents may be effected for features of the invention described above without departing from the scope of the invention. Accordingly, it is expressly intended that all such modifications, variations, substitutions and equivalents which fall within the spirit and scope of the invention as defined by the appended claims be embraced thereby. It should be understood that deviations from exactly repetitive wave cycles also perform in a similar manner except that the uniformity of the flow is progressively less stable and less predictable.

What is claimed is:

1. A method of injection molding wherein a quantity of synthetic resinous material is prepared for injection into a mold without overheating and with good melt quality, comprising processing resinous material in a feed and transition zone to melt a substantial portion of the material and advance it to a second zone, dividing the flow through said second zone into two parallel channels each of which has restricted cross-sectional areas at a plurality of locations along its length with the restricted areas in one channel being longitudinally offset from the restricted areas in the other channel and with the cross-sectional area of each channel varying cyclically over a plurality of substantially identical cycles, forcing most of the incompletely melted resinous material in each of said channels to pass through said restricted areas in that channel to receive extra energy input for melting the same thoroughly, and filtering a portion of the completely molten resinous material from one channel to the other with minimum energy input just in advance of each of said restricted areas to avoid the extra energy input associated with passage through said restricted areas and thereby to avoid overheating of the melted material, said cycles reinforcing one another and collectively providing a steady material flow rate and pressure at an output end of said second zone, and injecting a charge of the completely molten resinous material at the discharge end of said second zone into a mold cavity.

2. A method according to claim 1 wherein said filtering step includes facilitating the flow of molten resinous material from one channel to the other while simultaneously restricting the flow of unmelted resinous material to promote the separation of molten from unmelted material so as to concentrate the passage of unmelted material through the restricted areas and thereby maximize heating of the unmelted material and minimize heating of the molten material.

3. The method according to claim 1 wherein said channels are defined by the inner surface of a charge forming barrel and a rotating screw received therein, and said charge is injected by axially advancing the screw in the barrel toward the mold cavity.

* * * * *